United States Patent [19]

Wise

[11] 3,964,161

[45] June 22, 1976

[54] WOODEN CAMPING TOOL

[76] Inventor: Colleen M. Wise, 233 W. Macarthur, South Saint Paul, Minn. 55075

[22] Filed: Sept. 15, 1975

[21] Appl. No.: 613,346

[52] U.S. Cl. .................................... 30/142; 294/7; D7/102; D7/149
[51] Int. Cl.² ......................................... A47J 43/28
[58] Field of Search ...................... 30/142, 149, 324; D7/141, 148, 149, 102; 294/7

[56] References Cited
UNITED STATES PATENTS

| 1,461,686 | 7/1923 | Stone .............................. 30/149 X |
| 2,505,122 | 4/1950 | Krieger ............................. 30/324 |
| 2,634,497 | 4/1953 | Waldesbuehl ...................... 30/142 |
| 2,824,369 | 2/1958 | Welch ............................... 30/324 |
| D53,588 | 7/1919 | Grasberger ....................... 30/324 X |
| D235,307 | 6/1975 | Shoemaker ....................... 30/324 X |

*Primary Examiner*—Al Lawrence Smith
*Assistant Examiner*—J. C. Peters
*Attorney, Agent, or Firm*—Robert C. Baker

[57] ABSTRACT

A wooden cooking tool is taught wherein a shank of substantial strength connects a contoured spoon-bowl at one end and a contoured fanned spatula at the other. The spoon-bowl blends symmetrically into the shank portion and is contoured so that its outermost end projects ventrally relative to the axis of the tool. The spoon-bowl serves the function of not only a spoon-bowl per se, but also that of a handle member when the tool is turned upside down for use as a spatula. The size, shape and thickness of the spoon-bowl permit one to grip it with the fingers of one's hand inside the convex portion and the palm on the concave outer portion. The spatula is a contoured fanned structure which terminates in an angularly disposed substantially straight edge. The slope or angularity of this edge is such that the lateral extremity of it lying most outwardly from the shank is at the right of the axis of the tool as the tool is gripped at the spoon-bowl for spatula use and the spatula pointed upwardly.

5 Claims, 5 Drawing Figures

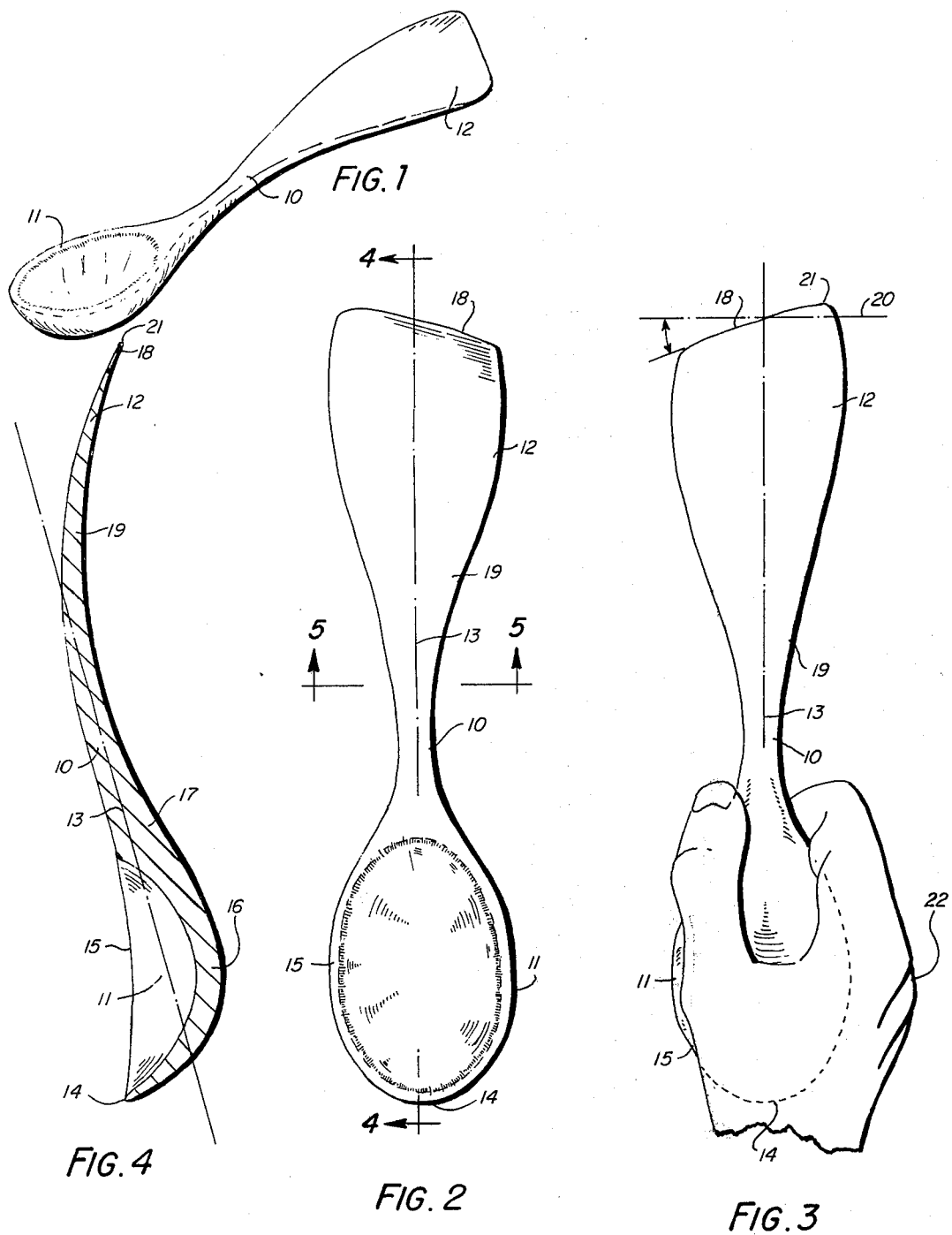

WOODEN CAMPING TOOL

This invention relates to a wooden tool, and more particularly to a wooden cooking tool characterized by many features which in combination make it especially useful for camp-type cooking.

The tool of this invention is both a spoon and a spatula; and it is the special arrangement of these elements and the size and shape of them which distinguishes the teachings hereof from the prior art.

Known prior art is set forth in the following U.S. Patents: Isaacs, U.S. Pat. No. 1,452,464, issued Apr. 17, 1923; Stone, U.S. Pat. No. 1,461,686, issued July 10, 1923; Tunick, U.S. Pat. No. 1,708,456, issued Apr. 9, 1929; Fadeley, Jr., U.S. Pat. No. 2,457,037, issued Dec. 21, 1948; and Waldesbuehl, U.S. Pat. No. 2,634,497, issued Apr. 14, 1953.

A critical feature of the present invention is that the cooking tool is made of wood. It is therefore relatively light in weight, as is critically necessary whenever backpack camping is contemplated. Further, it is also strong. The strength and lightness in weight arise from the fact that the tool is contoured in wood with the various portions forming the tool relatively thick and blended or contoured together so that there are substantially no weak sectors or portions readily susceptible to breakage under the use conditions for which the tool is designed.

The tool of this invention is unitary in structure. It is a unitary wooden cooking tool. It has a shank portion with a spoon-bowl at one end and a spatula at the other. A longitudinal axis lengthwise of the tool extends through the shank portion. The side of the tool facing upwardly when the spoon-bowl is used as a serving spoon is referred to herein as the ventral (or front) surface of the tool. The opposing side of the tool is called the dorsal (or back) surface thereof. The tool is further characterized by a combination of several features; and these features will not be detailed.

The spoon-bowl is contoured to blend symmetrically into the shank portion of the tool and extends symmetrically from the shank portion. It is contoured so that its outermost end projects ventrally relative to the axis of the tool. The spoon-bowl is free of sharp lip edges. It is wider than it is deep, and is approximately one-half cup in size. In terms of thickness, it is in excess of 5 millimeters thick at the bottom portion thereof and tapers along the sides to a narrower thickness at its non-sharp lip edges. The contoured shape and size and thickness and non-sharp lip edges of the spoon-bowl are such that the spoon-bowl serves a dual function for the tool. One function is that of a spoon-bowl per se. The other function is that of a handle member when the spoon-bowl is turned upside down so that the dorsal (or back) side of the tool faces upwardly for the tool to be used for spatula purposes. The upside down spoon-bowl, as a handle member, is gripped by one's hand with the fingers inside the convex portion of the spoon-bowl and the palm on the concave outer portion thereof.

The spatula of the tool is contoured to blend into the shank portion and, except for its end most remote from the spoon-bowl, extends as a symmetrical structure from the shank portion. This spatula is a gradually fanned structure curved away from the axis of the tool so as to project dorsally relative to the axis. The spatula is free of sharp edges except at its most remote end or termination. It is at least 5 millimeters thick except for the distance up to approximately 4 centimeters inwardly from its most remote end. The spatula also is tapered toward its most remote end into a termination as a relatively sharp substantially straight edge which slopes at an angle other than perpendicular to the axis of the tool. The slope of the straight edge is between about 5° and 25° from a line perpendicular to the tool axis. The slope of this straight edge also is characterized by the fact that the off-center outwardmost lateral portion of the slope is on the lateral side of the tool most remote from an individual gripping the spoon-bowl as a handle member and using the tool for spatula purposes. The gradually fanned structure of the spatula is functional as a handle member for gripping when the tool is used as a serving spoon.

The shank portion of the tool is, in cross-section, at least about 1 centimeter in thickness in all directions through the center or axis thereof.

The invention will further be described by reference to a drawing made a part hereof wherein:

FIG. 1 is a schematic perspective view of the tool;

FIG. 2 is a schematic plan view of the ventral surface of the tool, that is, the upper surface when the tool is used as a spoon;

FIG. 3 is a schematic plan view of the dorsal surface of the tool, and includes a showing of a right hand gripping the spoon-bowl portion of the tool;

FIG. 4 is a schematic cross-sectional view taken on line 4—4 of FIG. 2; and

FIG. 5 is a schematic cross-sectional view taken on line 5—5 of FIG. 2.

Referring to the drawing, the tool has a shank portion 10 connecting a spoon-bowl 11 at one end and a spatula 12 at the other. The shank portion 10 is relatively thick and should be at least about 1 centimeter (but not over about 2 centimeters) in thickness along lines extending through the center or axis 13 of the shank. The shank may be as short as 3 or 4 centimeters in length or as long as possibly 10 centimeters in length. However, longer shank portions are unnecessary and merely add to size without contributing to benefits for camping use. A shank about 5 centimeters in length is most practical. For purposes of description, it is important to have a reference line; and for that purpose, the tool is considered to have a longitudinal axis 13. It extends through the center of the shank portion at the medial portion of the shank between the spoon and spatula.

The contour of the spoon-bowl 12 as it extends outwardly from the shank portion is symmetrical. In other words, the spoon-bowl is not twisted to the right or left of the axis 13. It instead extends symmetrically on each side of the axis, as illustrated in FIGS. 2 and 3. The outer end 14 of the spoon-bowl is contoured to cause it to project or extend ventrally relative to axis 13 as well as ventrally more than the body of the shank 11 from axis 13; see FIG. 4. The lip edges 15 of the spoon-bowl terminate substantially in a single plane, with lateral lip edge portions slightly depressed. These lip edges do not terminate into a sharp cutting edge. The bowl is wider than it is deep. Further, the length of the spoon-bowl is almost approximately twice as great as the depth thereof. The size of the spoon-bowl is such that it holds approximately one-half cup of material or liquid.

A critical feature of the spoon-bowl is that is must be at least about 5 millimeters (but not over about a centimeter) in thickness at the bottom portion 16 thereof, and preferably also along a back portion 17 connecting the shank 10 to the bottom 16. It then tapers along the sides and tip portion thereof to a narrower thickness at the non-sharp lip edges. The lip edges may also be relatively thick, up to about three or four or possibly 5 millimeters, but need not be over about a millimeter or two in thickness. The contoured shape as well as the size and thickness of the spoon-bowl, plus the fact that the lip edges are not sharp, all contribute to an important feature of the spoon-bowl in addition to its feature or function as a spoon-bowl per se. When the spoon-bowl is turned upside down, it serves as a handle member. With the dorsal side of the tool facing upwardly and the spoon-bowl upside down, one is able to grip the spoon-bowl with one hand so that the fingers of the hand rest comfortably inside the convex portion of the spoon-bowl and the palm of the hand rests on the outer concave portion thereof. This grip is ideal when the tool of the invention is used for spatula purposes. To be recognized is that by gripping the spoon-bowl portion of the tool, considerable control is exercised against rotation of the tool within one's hand as it is used for spatula purposes; and this control is accomplished without excessively firm gripping as would be necessary if one were to grip exclusively a relatively smooth shank portion. The fact that the spoon-bowl broadens out, or extends outwardly (as compared to the shank) from the longitudinal axis of the tool, contributes to this result.

The spatula 12 is contoured to blend into the shank portion 10 and extends symmetrically from the shank portion—except that the outermost or most remote end 18 of the spatula (away from the spoon-bowl) is not symmetrical with respect to the axis 13. To be noted is that the spatula extends from the shank portion 10 as a gradually fanned structure 19. The curvature of this fan structure 19 is away from the axis 13. The curvature actually causes the spatula end 18 to project dorsally relative to the axis 13 a greater distance than any other part of the tool. The edges of the spatula do not terminate in any sharp or "cutting" edge, except for the most remote or terminal end 18 thereof. For the most part, the spatula is at least about 5 millimeters thick except for the very terminal or most remote end of it. At about approximately 3 or 4 centimeters distance inwardly from its most remote end, the spatula suitably is gradually contoured to a narrower thickness. It is tapered toward its most remote end into a termination edge analogous to a blunt knife edge. This termination edge is suitably as sharp as possible consistent with retaining strength for the wood structure of it. It is a relatively straight edge. But the slope of this edge is at an angle other than perpendicular to the axis of the tool (see FIGS. 2 and 3). The slope of edge 18 is between about 5° and 25°, preferably between about 10° and 25°, from a dash line 20 perpendicular to the axis 13 through the tool. Further, the slope of this straight edge 18 is such that its off-center outwardmost lateral portion 21 (that is, the right part of it in FIG. 3), is on the lateral side of the tool (relative to the axis) which is located most remote from an individual gripping the spoon-bowl as a handle member in the manner aforedescribed. In other words, the outermost part 21 of the terminal edge 18 of the spatula is on the side of the tool where one's knuckles 21 are located when the tool is gripped at the spoon-bowl as aforediscussed. This relationship is illustrated in FIG. 3; and the grip illustrated in FIG. 3 is that of a right-handed person gripping the spoon-bowl of the tool and using the tool for spatula purposes to scrape out a kettle, or to slide under a fish being fried, or the like.

An important feature of the spatula is that its fanned structure 19 is functional as a handle member for gripping when the tool is used as a serving spoon. To be recognized is that the fingers of one's hand press against the dorsal side of the fanned portion 19 and the palm of one's hand presses against the ventral side thereof as the tool is being used for serving spoon purposes. Again, the fact that the fanned structure of the spatula extends laterally outwardly from the axis 13 of the tool contributes to excellent control of the tool when it is held for use as a spoon; and this control is easily accomplished without any great strength of grip simply because rotation of the tool within the noted grip is next to impossible.

The shank portion of the tool (and indeed, the fan portion and most of the spoon portion) possesses sufficient strength so that, if one should desire to do so, one may grip the tool either at the spoon-bowl or at the fanned structure of the spatula and slip the tool under the loop of a handle for a kettle or the like and rest that looped handle of the kettle on the shank per se, as the kettle is lifted from a campfire using the tool of the invention.

The extraordinary simplicity of the tool in combination with the fact that it is made of wood and possesses features making it satisfactory to handle most cooking chores except those involving critical employment of a fork member distinguishes the present tool from other implements heretofore available in the art. More importantly, the tool of the present invention possesses the necessary attributes making it an excellent instrument for campers. They not only desire lightness in weight when backpacking, but also desire to avoid carrying extra implements. The tool of this invention satisfies their needs and also permits them to accomplish all necessary cooking chores without hazard and with some degree of grace.

In a tool of this invention made especially for use by a right-handed person, the lateral outermost portion of the terminal spatula slope (most remote from the spoon-bowl) is at the right of the axis of the tool when the tool is held with its dorsal side facing the viewer and its spoon-bowl lowermost. Conversely, in a tool made especially for use by a left-handed person, the lateral portion of the terminal spatula slope located most remote from the spoon-bowl is at the left of the axis of the tool when the tool is held with its dorsal side facing the viewer and its spoon-bowl lowermost.

The slope of the terminal end of the spatula is critical in combination with the contour and relative size and shape of other portions of the tool, including the grip feature of the spoon-bowl. All these features in combination make the tool easily handled in use. Most important is the fact that the slope of the end of the spatula contributes to ease of using it, when the spoon-bowl is gripped as aforenoted, to push and slide it angularly with ease under a pancake or fish and turn the same in a pan. The natural push sliding movement involves a slight movement of the spatula in an angular direction toward the side of the spatula having the shorter terminal end. Further, the natural hand movement for turning a pancake (or the like) causes the off-center lateral outermost end of the termination of the spatula to sweep in the greatest arc of turning movement; and the greater extension of that lateral outermost end contributes to ease of control of the food being turned.

The fan of the spatula should broaden out to at least 5 centimeters; and the width of the spoon-bowl suitably approaches but does not exceed the breadth of the fan of the spatula. The overall length of the tool lies within the range of 25 to 35 centimeters.

The unitary construction imparts desired strength to the tool; and to this end, the tool is preferably cut and formed or carved and otherwise shaped out of a single piece of wood (such as pine, oak, birch, or other woods having similar resistance to deformation in use). No paints or varnishes need be employed. Far more preferable is the step of seasoning the wood of the tool by letting the wood take up cooking oils before actually using the tool in cooking. Rubbing the tool with vegetable oils before use is recommended. Also to be recognized is the fact that the insulating character of wood saves the camper from burned fingers.

That which is claimed is:

1. A unitary wooden cooking tool having a shank portion with a spoon-bowl at one end and a spatula at the other, said tool having a longitudinal axis lengthwise thereof extending through said shank portion, the side of said tool facing upwardly when said spoon-bowl is used as a serving spoon being the ventral surface of said tool, and the opposing side of said tool being the dorsal surface thereof, said tool being characterized by the following features in combination:

a. said spoon-bowl is contoured to blend into said shank portion and extends symmetrically from said shank portion, is contoured so that its outermost end projects ventrally relative to said axis, is free of sharp lip edges, is wider than it is deep, is approximately one-half cup in size, and is in excess of 5 millimeters thickness at the bottom portion thereof and tapers along the sides thereof to a narrower thickness at said non-sharp lip edges thereof, said contoured shape and size and thickness and non-sharp lip edges of said spoon-bowl being such that said spoon-bowl serves a dual function, one function being that of a spoon-bowl per se and the other function being that of a handle member when said spoon-bowl is turned upside down so that the dorsal side of said tool faces upwardly for said tool to be used for spatula purposes, said upside down spoon-bowl, as a handle member, being gripped by one's hand with the fingers inside the convex portion of the spoon-bowl and the palm on the concave portion thereof;

b. said spatula is contoured to blend into said shank portion and, except for its end most remote from the said spoon-bowl, extends as a symmetrical structure from said shank portion, is a gradually fanned structure curved away from said axis to project dorsally relative to said axis, is free of sharp edges except at its said most remote end, is at least 5 millimeters thick except for the distance up to approximately 4 centimeters inwardly from its said most remote end, and is tapered toward its said most remote end into a termination as a relatively sharp substantially straight edge which slopes at an angle other than perpendicular to said axis, said slope of said straight edge being between 5° and 25° from a line perpendicular to said axis, and said slope of said straight edge being further characterized by the fact that the off-center lateral outwardmost portion of said slope is on the lateral side of said tool most remote from an individual gripping said spoon-bowl as aforesaid and using said tool for spatula purposes, said gradually fanned structure of said spatula being also functional as a handle member for gripping when said tool is used as a serving spoon; and c. said shank portion of said tool is, in cross-section, at least about one centimeter in thickness in all directions through the center thereof.

2. The tool of claim 1, adapted for use by a right-handed person, wherein said lateral outwardmost portion of said slope most remote from said spoon-bowl is at the right of said axis of said tool when said tool is held with its dorsal side facing the viewer and its said spoon-bowl lowermost.

3. The tool of claim 1, adapted for use by a left-handed person, wherein said lateral outwardmost portion of said slope most remote from said spoon-bowl is at the left of said axis of said tool when said tool is held with its dorsal side facing the viewer and its said spoon-bowl lowermost.

4. The tool of claim 1, wherein said slope of said straight edge is between approximately 10 and 20 degrees from a line perpendicular to said axis.

5. The tool of claim 1, cut and formed out of a single piece of wood.

* * * * *